C. D. ENOCHS.
TELEPHONE TRANSMITTER.
APPLICATION FILED OCT. 2, 1906.

908,551.

Patented Jan. 5, 1909.

3 SHEETS—SHEET 1.

Witnesses:
Chas. E. Gaylord
John Enders

Inventor:
Claude D. Enochs.
By Kempster B. Miller
Atty.

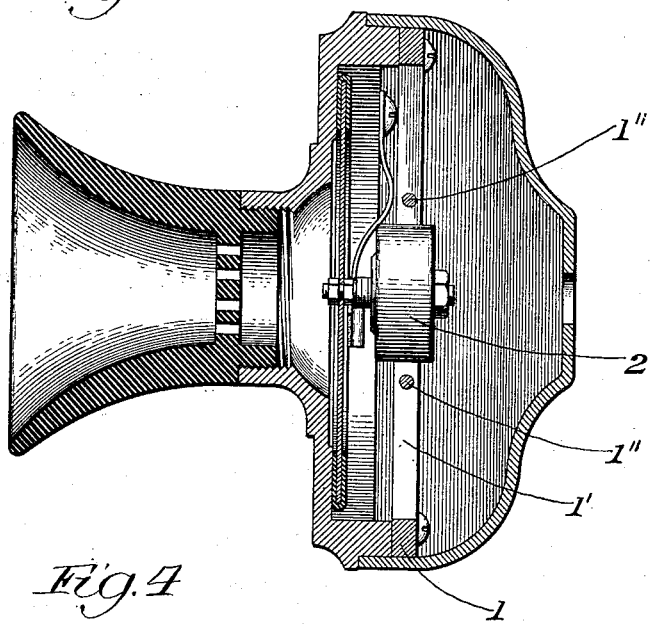
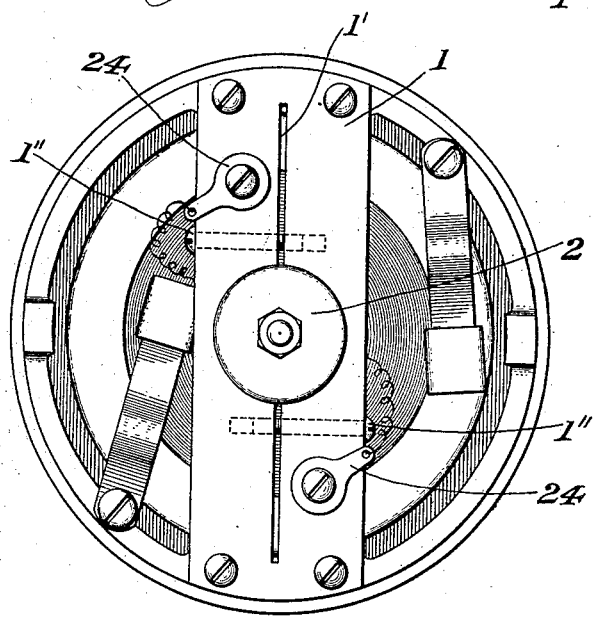

C. D. ENOCHS.
TELEPHONE TRANSMITTER.
APPLICATION FILED OCT. 2, 1906.

908,551.

Patented Jan. 5, 1909.
3 SHEETS—SHEET 3.

Witnesses:

Inventor:
Claude D. Enochs.

UNITED STATES PATENT OFFICE.

CLAUDE D. ENOCHS, OF LA CROSSE, WISCONSIN.

TELEPHONE-TRANSMITTER.

No. 908,551.  Specification of Letters Patent.  Patented Jan. 5, 1909.

Application filed October 2, 1906. Serial No. 337,085.

*To all whom it may concern:*

Be it known that I, CLAUDE D. ENOCHS, a citizen of the United States of America, and a resident of La Crosse, county of La Crosse, and State of Wisconsin, have invented a new and useful Improvement in Telephone-Transmitters, of which the following is a specification.

My invention pertains to improvements in details of telephone transmitter construction, and has for its object the production of a transmitter of great efficiency and of simple construction, and at the same time one which will operate satisfactorily without introducing objectionable limitations in the method or manner of its mounting for service.

In my improved transmitter, I provide a carbon cell having multiple front and back electrodes, the current of transmission passing two or more times through the granular carbon of the cell in its circuit through the transmitter; I provide also a carbon cell uniform about its axis, so that it may be installed for service in any angular position upon its axis without detriment to its operation; I provide also a simple means for mounting the carbon cell within the containing transmitter case.

Figure 1:
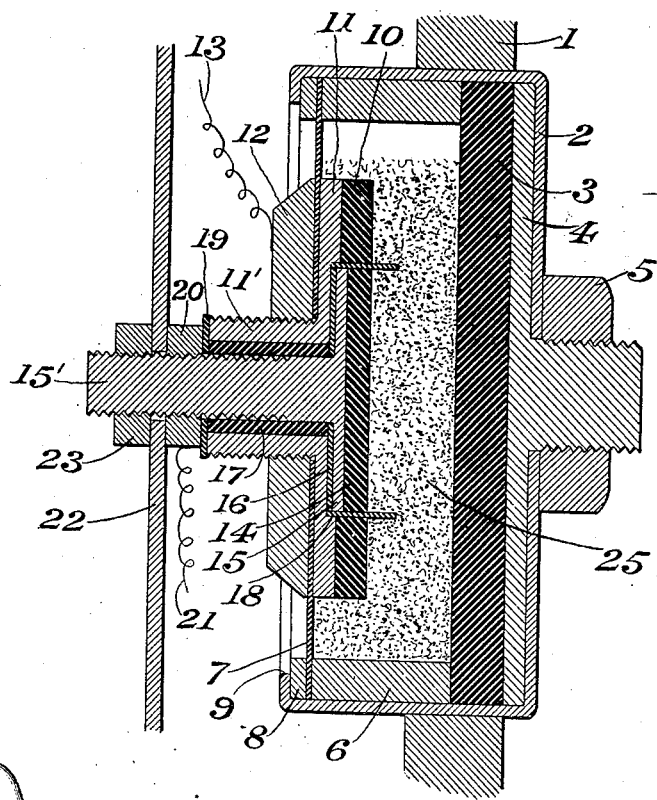
Figure 2:
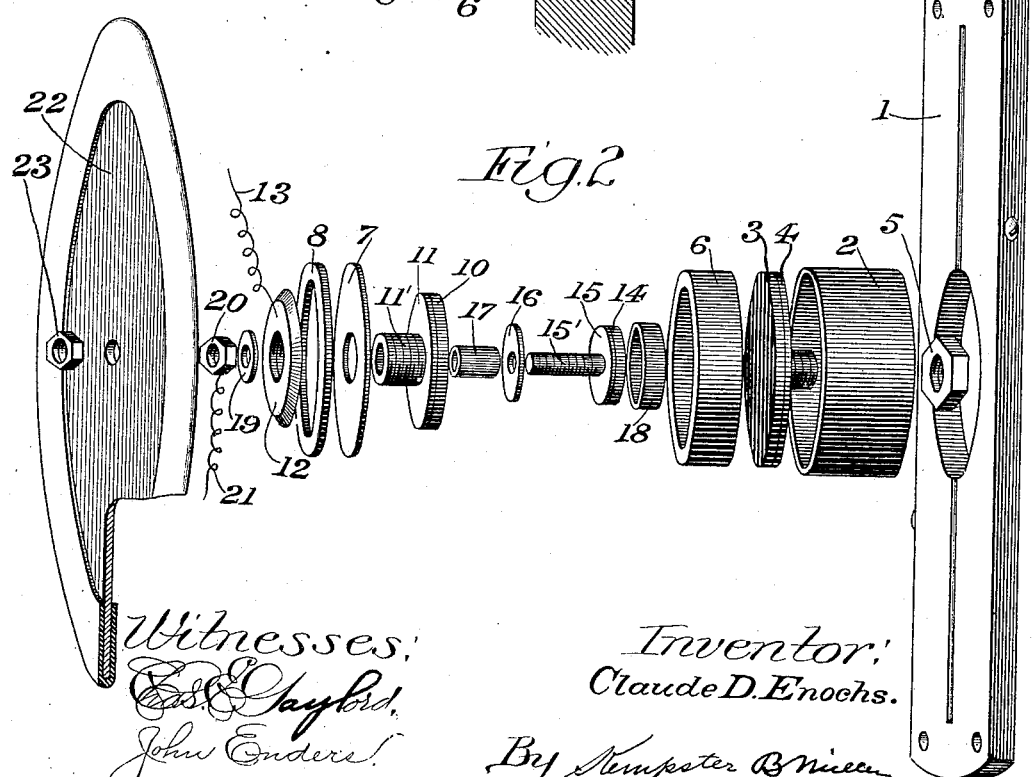
Figure 5:
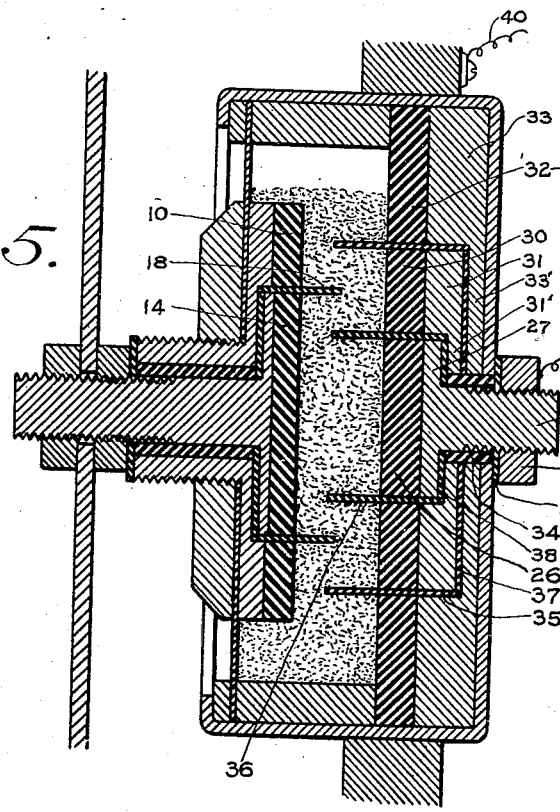
Figure 6:
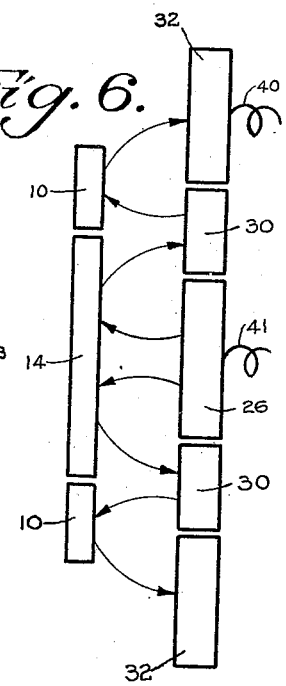
Figure 7:
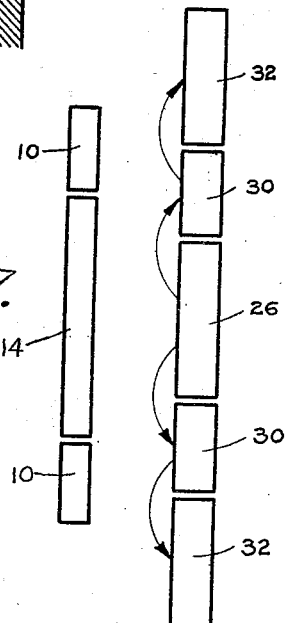

Seven figures accompany this specification, in which,

Figure 1 shows a section of a simple form of carbon cell embodying my invention in a very simple form, the front electrode being double and the back electrode being single; Fig. 2 shows the various elements which go to make up the cell of Fig. 1 (excepting the granular carbon) in position and arrangement leading easily to an understanding of the assembly of the cell; Fig. 3 shows a section of the transmitter case and bridge; Fig. 4 shows an elevation of the back of the transmitter mechanism, with the back of the case removed; Fig. 5 shows a section of a carbon cell constructed according to my invention, in which both front and back electrodes are multiple ones, the multiple front electrode being composed of two insulated electrodes, and the multiple back electrode being composed of three insulated electrodes; Fig. 6 shows diagrammatically the circuit conditions of the carbon cell of Fig. 5; and Fig. 7 shows a modification of the circuit of Fig. 6.

Referring to Fig. 1, the construction and method of operation of my improved carbon cell will become clear; 1 is the transmitter bridge adapted to support the back electrode rigidly; 2 is the metallic cup of the carbon cell; 3 is the back electrode, in this case a simple one; 4 is the metallic support for the back electrode upon which the electrode 3 is mechanically mounted, and which has a screw-threaded stud projecting through the case 2 and carrying the nut 5 by which the back electrode is held rigidly in the metallic cup of the cell; 6 is a washer or distance piece for securing and retaining proper distance between the back electrode 3 and the mica diaphragm 7; 8 is a washer to protect the edge of the mica diaphragm when the edge of the metallic cup 2 is formed over as shown at 9 to hold the mica diaphragm in place. Before the mica diaphragm is placed in the metallic cup of the carbon cell, the front electrodes are assembled upon it as follows: 10 is an annular electrode; 11 is a metallic support for the annular electrode to which the electrode is mechanically and electrically united, and which has a tubular stud externally screw-threaded and adapted to project through the mica diaphragm 7 to receive the nut 13, the two parts 11 and 12 thus being adapted to clamp the mica diaphragm between them; terminal conductor 13 is attached to the nut 12; thus terminal conductor 13 is electrically in connection with the annular front electrode; 14 is a circular electrode of diameter slightly smaller than the inner diameter of the annular electrode 10; 15 is a metallic support for the electrode 14 to which the electrode 14 is mechanically and electrically united, and which has a screw-threaded stud 15' extending from the central part thereof; 16 is an insulating washer adapted to slip over the stud 15' and to rest against the face of the electrode support 15; 17 is an insulating tube adapted to fit closely over the stud 15'; 18 is an insulating ring; when 16 and 17 are assembled upon 14 and 15, the circular electrode is forced into the annular electrode with the insulating ring 18 separating them and clamped between them; insulating washer 19 then is placed over the stud 15' and nut 20 is turned into place to clamp all rigidly together; terminal conductor 21 attached to nut 20 is electrically in connection with the circular front electrode. The assembly of the complete carbon cell therefore is: The back electrode 3 attached to support 4 is placed in cup 2 and clamped by nut 5; distance-ring 6 is placed in cup on back electrode; a measured amount of granular carbon 25 is placed in the cup; mica diaphragm 7 with front electrodes previously assembled is placed on ring 6; washer 8 is placed on diaphragm 7 and the edge of the metallic cup 2 is spun down as shown at 9. The complete transmitter front then is assembled by clamping the cell in the bridge 1 and attaching the front electrodes to the transmitter diaphragm 22 by the nut 23.

As a means for mounting the assembled carbon cell in the transmitter case, I provide a novel, simple and efficient bridge. The bridge 1 is split nearly from end to end by the slot 1' and is bored out at the center to receive closely the metallic cup 2 of the carbon cell; two screws 1" 1" are adapted to draw the sides of the slot 1' together and thus to clamp the carbon cell rigidly in a position of proper adjustment. Terminals 24 24 are mounted upon the bridge for convenience.

The electrical circuit through the carbon cell is as follows: 13 12 11' 11 10 25 3 25 14 15 15' 20 21; it is probable that a portion of the current flows from electrode 10 through the granular carbon around the insulating ring 18 to the electrode 14 without passing through any portion of the back electrode 3. The path through the granular carbon 25 therefore is double, or at least longer, than a single passage through the granular carbon from front to back electrode as in ordinary transmitter cells, and the granular carbon therefore may form a larger proportion of the total resistance of the primary battery circuit; any proportional variation in the resistance of the granular carbon unit therefore will cause a larger proportional variation in the transmitter circuit than where the granular carbon is but once traversed by the circuit, and an improved efficiency of the transmitter results.

Fig. 5 shows the combination of the double front electrode of Fig. 1 with a multiple back electrode, the multiple back electrode being formed of three separate and insulated electrodes; a center circular electrode 26 has supporting plate 27 and screw-threaded stud 28, the stud 28 carrying the nut 29; annular electrode 30, on its supporting flanged ring 31, surrounds the electrode 26, as does also annular electrode 32, on its flanged supporting ring 33; in the case of the flanged supporting rings 31 and 33, the inwardly projecting flanges 31' and 33' respectively are perforated to permit the passage of the stud 28 and its insulating sleeve 34 but not to permit the passage of the supporting plate 27, so that the two annular electrodes 30 and 32 are retained upon the stud 28 by the nut 29; by the insulating sleeves 34, 35 and 36, and the insulating washers 37, 38 and 39, the three electrodes 26, 30, 32, are insulated from each other, and all are locked together by the nut 29 upon the stud 28.

The path of the current through the carbon cell of Fig. 5 is from connecting conductor 41 through stud 28 to the electrode 26, thence through the granular carbon 25 to the electrode 14, thence again through the granular carbon to the electrode 30, thence again through the granular carbon to the electrode 10, thence again through the granular carbon to the electrode 33 and through the metal shell of the carbon cell to the connecting conductor 40, thus passing through the granular carbon four times in its total path through the cell; this path is illustrated diagrammatically in Fig. 6, the same reference numbers applying.

Some flow of current through the granular carbon will occur from electrode 26 to the electrode 30, and again from electrode 30 through the granular carbon to electrode 32, as indicated by the arrows in Fig. 7, but the insulating barriers 35, 18 and 36, which, by making the paths indicated by the arrows of Fig. 7 longer and more tortuous, tend to promote the flow of current over the paths indicated in Fig. 6, thereby increasing the efficiency of the transmitter.

By the circular form of the compound or multiple electrodes, the transmitter may be mounted in any angular position with reference to its axial line, or may be turned upon its axis without affecting its efficiency.

I do not wish to limit myself to the exact details herein illustrated and described, as I understand that many variations may be made without departing from the spirit or scope of my invention.

Having thus described my invention, what I claim as new and desire to secure by United States Letters Patent is:

1. In a telephone transmitter, a pair of compound electrodes; insulating leaves separating the elements of said compound electrodes and projecting from the face thereof, the leaves of one electrode interleaving with the leaves of the opposite electrode, substantially as described.

2. In a telephone transmitter, a pair of compound electrodes comprising disk and annular electrodes, the faces of said compound electrodes being opposite each other; projecting insulating leaves separating said electrodes and forming barrier walls to current through the granular carbon of the transmitter, the leaves of one electrode interleaving with the leaves of the other electrode; granular carbon between said electrodes; said electrodes and said carbon forming a conducting path controlled in part by said leaves and including electrode elements of said compound electrodes alternately, substantially as described.

3. In a telephone transmitter, a pair of compound electrodes; insulating leaves separating the elements of said compound electrodes and projecting from the face thereof, the leaves of one electrode interleaving with the leaves of the opposite electrode; comminuted conducting material between said electrodes; said electrodes and said conducting material forming a conducting path controlled in part by said leaves and including elements of said compound electrodes alternately, substantially as described.

4. In a telephone transmitter, a microphone cell containing electrodes and a comminuted conducting material; and nonconducting barriers mechanically attached to said electrodes and projecting into said conducting material, the barriers of one of said electrodes interleaving with the barriers of the opposite electrode and operating to lengthen the path of current through the microphonic cell, substantially as described.

Signed by me at La Crosse, county of La Crosse, and State of Wisconsin, in the presence of two witnesses.

CLAUDE D. ENOCHS.

Witnesses:
WM. J. ROTH,
H. D. WARREN.